United States Patent [19]
Duncan

[11] Patent Number: 5,832,213
[45] Date of Patent: Nov. 3, 1998

[54] FLEXIBLE MOUNTING AND UNMOUNTING OF USER REMOVABLE MEDIA

[75] Inventor: William L. Duncan, Colorado Springs, Colo.

[73] Assignee: Sun Microsystems, Inc., Palo Alto, Calif.

[21] Appl. No.: 675,039

[22] Filed: Jul. 3, 1996

[51] Int. Cl.[6] .............................. G06F 11/00; G11B 15/00
[52] U.S. Cl. ...................... 395/188.01; 395/500; 711/111
[58] Field of Search .............................. 395/186, 188.01, 395/187.01, 438, 284, 490, 500; 364/478.03; 711/111, 112, 163

[56] References Cited

U.S. PATENT DOCUMENTS

| | | | |
|---|---|---|---|
| 4,792,896 | 12/1988 | Maclean et al. | 364/200 |
| 5,168,441 | 12/1992 | Onarhein et al. | 364/146 |
| 5,379,431 | 1/1995 | Lemon et al. | 395/700 |
| 5,416,914 | 5/1995 | Korngiebel et al. | 395/425 |
| 5,465,329 | 11/1995 | Whisler | 395/438 |
| 5,652,876 | 7/1997 | Ashe et al. | 395/500 |

FOREIGN PATENT DOCUMENTS 0 415 346 A2  6/1991  European Pat. Off.  .......... G06F 9/44

OTHER PUBLICATIONS

Computer System and Network Security, CRC Press, pp. 75–84, 184–186, 1995.

Ross B. et al., "Volume Management By The Book: The Nastore Volume Manager", Proceedings of the Symposium on Mass Storage systems, Oct. 7, 1991, pp. 95–99.

*Primary Examiner*—Joseph Palys
*Attorney, Agent, or Firm*—William J. Kubida; James A. Pinto; Holland & Hart LLP

[57] ABSTRACT

A computer implemented method and apparatus for mounting a user removable media in a computer system includes acquiring a media identifier input and a function identifier input from a user of the computer system. The media identifier input identifies the user removable media, and the function identifier input specifies a mounting operation to be performed on the user removable media. The media identifier and the function identifier inputs are processed to access a system media interface of the computer system, for example, by converting the media identifier input to a physical path of the user removable media in the computer system, and determining if the physical path of the media identifier input is valid within the computer system. A simulated media event is generated to mount the user removable media in the computer system. If desired, a determination may be made whether the user has valid permission to control the user removable media identified by the media identifier input. This may be performed by reading a media permission level associated with the user removable media identified by the media identifier input, reading a user permission level associated with the user, and comparing the media permission level to the user permission level.

15 Claims, 8 Drawing Sheets

Fig. 7

FLEXIBLE MOUNTING AND UNMOUNTING OF USER REMOVABLE MEDIA

BACKGROUND OF THE INVENTION

1. Field of the Invention

This invention relates to management of removable media in a computing system. More particularly, the invention relates to the mounting and unmounting of user removable media, such as a floppy disk, in a UNIX-based computing system.

2. Description of Related Art

In conventional computing systems, there are generally two types of media which contain information accessible by a user of the computing system. User removable media is media which a user could insert or remove from the computing system. For instance, floppy discs, CD ROMS, and ZIP-drives are all examples of user removable media, as these media are easily and readily inserted or removed by a user into the computing system. In contrast, nonuser removable media consists of media which a system administrator would generally insert or remove from the computing system. For example, a system administrator would generally install or remove a high capacity disc drive from the computing system.

Within a UNIX system, a floppy disk can have either raw data or data arranged in a file system. For instance, the TAR utility, widely used within UNIX computing systems, can be used to take a group of files and place these files in a single file of raw data on a disk. In contrast, data can be arranged on a floppy disk in a file system format having a hierarchy of directories, subdirectories, and files encoded on the floppy disc.

In a UNIX-based computing system, such as Solaris, a volume management interface is conventionally provided for mounting of user removable media such as floppy discs. When a media having a file system format, such as a floppy disc, is mounted into the computing system, the conventional volume management interface does not allow the user to easily store raw, non-file system data on the media. Specifically, the conventional volume management interface makes the assumption that a media having a file system format should be interpreted only as a file system.

While this assumption made by the conventional volume management interface in a UNIX system is generally correct, there are instances where a user may desire to place raw, non-file system data on a media, such as a floppy disc, which has an existing file system format. For example, a user may want to use an existing floppy disc to store raw, non-file system data provided by the TAR utility explained above.

Furthermore, the conventional volume management interface in a UNIX system is not readily accessible or controllable by the user. A main precept of management of user removable media is that the user should not be required to obtain root or supervisor privileges in order to mount the media in the computing system. Access to the conventional volume management interface is complicated by, among other things, the privileges required to access the interface, as well as the environment and other variables the conventional interface expects.

Hence, in UNIX-based computing systems, there is presently no simple and flexible user interface for the mounting and unmounting of user removable media.

SUMMARY OF THE INVENTION

In accordance with the invention, the above problems have been addressed by a broad aspect of the invention, in which a method is presented for mounting a user removable media in a computer system. The method may be performed by computer implemented steps. The steps include acquiring a media identifier input and a function identifier input from a user of the computer system. The media identifier input identifies the user removable media, and the function identifier input specifies a mounting operation to be performed on the user removable media. The media identifier and the function identifier inputs are processed to access a system media interface of the computer system.

The processing may be performed by converting the media identifier input to a physical path of the user removable media in the computer system, and determining if the physical path of the media identifier input is valid within the computer system. A simulated media event is generated to mount the user removable media in the computer system. An additional step of determining if the user has valid permission to control the user removable media identified by the media identifier input may be performed if desired as a part of generating a simulated media event. This may be performed by reading a media permission level associated with the user removable media identified by the media identifier input, reading a user permission level associated with the user, and comparing the media permission level to the user permission level. If desired, a required permission level to the user for accessing the system media interface may be provided, and a plurality of environment variables may be set for accessing the system media interface.

The method may also include calling the system media interface with the simulated media event corresponding to the media identifier input and the function identifier input of the acquiring step. It may also include reading a return value from the system media interface, the return value indicating a successful outcome of the simulated media event, and passing the return value to the user.

In a machine implementation of the invention, an apparatus is presented for mounting a user removable media in a computer system. The computer system is of the type that has a processor, an input/output device, and a data storage device. The apparatus includes a user input module for acquiring a media identifier input and a function identifier input from a user of the computer system. The media identifier input identifies the user removable media, and the fucntion identifier input specifyies a mouting operation to be performed on the user removable media. An input processing module for processes the media identifier input and the function identifier input to access a system media interface of the computer system. A simulating module generates a simulated media event to the media interface to mount the user removable media in the computer system.

In one embodiment, the apparatus may further include a privilege verification module for comparing an access privilege of the user to a media access privilege of the user removable media. An environmental setting module sets an environment variable used by the system media interface. In addition, a feedback module provides a return value from the system media interface to the user, the return value indicating a successful outcome of the simulated media event.

The above computer implemented steps in another implementation of the invention are provided as an article of manufacture, i.e., a computer storage medium containing a computer program of instructions for performing the above-described steps. According to the article of manufacture implementation, a computer program storage medium readable by a computing system and encoding a computer program of instructions for mouting a user removable media in a computer system is presented. The computer instructions include acquiring a media identifier input and a function identifier input from a user of the computer system. The media identifier input identifies the user removable media, and the function identifier input specifies a mounting operation to be performed on the user removable media. The media identifier input and the function identifier input are processed to access a system media interface of the computer system. A simulated media event is generated to the media interface to mount the user removable media in the computer system.

One utility of the invention is to provide a flexible and simple user interface for mounting and unmounting user removable media in a computing system, alleviating the need for the user to manipulate access privileges or environment variables required by conventional volume management interfaces.

Another utility of the invention is to permit the user to access user removable media for storing raw, non-file system data, regardless of the prior format utilized within the user removable media.

The foregoing and other features, utilities and advantages of the invention will be apparent from the following more particular description of a preferred embodiment of the invention as illustrated in the accompanying drawings.

BRIEF DESCRIPTION OF DRAWINGS

The invention is illustrated in the accompanying drawings, in which.

DETAILED DESCRIPTION OF PREFERRED EMBODIMENTS

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of computing system implementing the invention. Accordingly, the logical operations making up the embodiments of the invention described herein are referred to variously as operations, steps, or modules.

Figure 1:
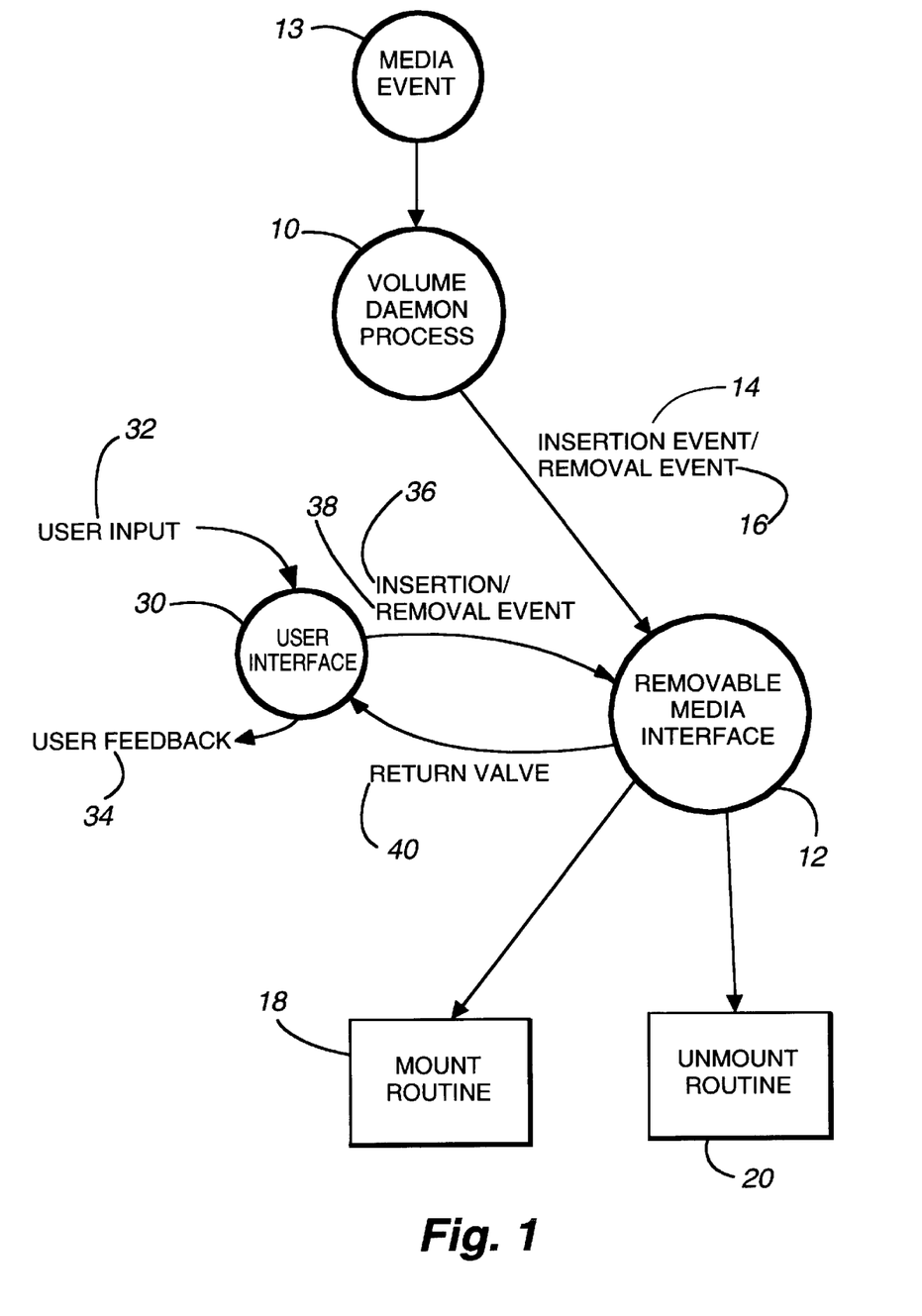
FIG. 1 illustrates a preferred embodiment of the present invention, and in particular the user interface of the present invention.

FIG. 1 shows a block diagram of the preferred embodiment of the present invention. As discussed in detail below, the present invention provides a user interface 30 for user removable media. Based on input 32 received from the user, user interface 30 accesses the conventional volume management interfaces for mounting and unmounting the user removable media.

As used in this application, the term "mount" is defined to be the logical attachment of a data structure, located within a media, to a user's existing file system thereby making the data structure accessible to the user. The term "unmount" refers to logically detaching the data structure contained within a media from the user's existing file system.

Referring again to FIG. 1, volume management in a conventional UNIX computing system is provided by volume daemon 10, known as "vold", and removable media interface 12, known as "rmmount" (remote media mount), which accesses mount routine 18 and unmount routine 20.

In response to a media event 13, the volume daemon process 10 generates either an insertion event 14 or a removal event 16 to the removable media interface 12. Process 10 is considered a daemon process because it is a long-lived process that provides the system related service of mounting and unmounting media in the computing system.

The removable media interface 12, being an event driven interface, accordingly activates mount routine 18, which mounts the media in the computing system, or unmount routine 20 which unmounts the media from the computing system.

In conventional UNIX computing systems, removable media interface 12 is not readily accessible by a user. In other words, a user cannot easily mount or unmount a media in the computing system by merely calling the removable media interface 12. In particular, removable media interface 12 generally requires root privileges for access thereto, and therefore is conventionally called only by volume daemon process 10.

In accordance with the present invention, a user interface 30 is provided for mounting or dismounting media in the computing system. In response to user input 32, user interface 30 generates simulated insertion events 36 or removable events 38 to the removable media interface 12. Removable media interface 12 then accordingly activates either mount routine 18 or unmount routine 20. Removable media interface 12 then generates a return value 40 to the user interface 30, and this return value is passed by the user interface 30 in the form of user feedback 34.

In one embodiment of the invention, the user interface 30 can be implemented as a set-user-identifier (setuid) program in a UNIX-based computing system. When the user interface 30 is accessed by a user, the permissions and privileges of the user are augmented to include the privileges associated with the user interface. The use interface 30 is therefore designed to have all of the privileges required to properly access the removable media interface 12. In this manner, user interface 30 alleviates the need for the users to artificially alter their privilege levels in order to control the mounting and unmounting of user removable media.

The logical operations performed by user interface 30 and the use of user interface 30 to transfer raw, non-file system data to a media, such as a floppy disk having a file system format, are explained in greater detail below.

Figure 2:
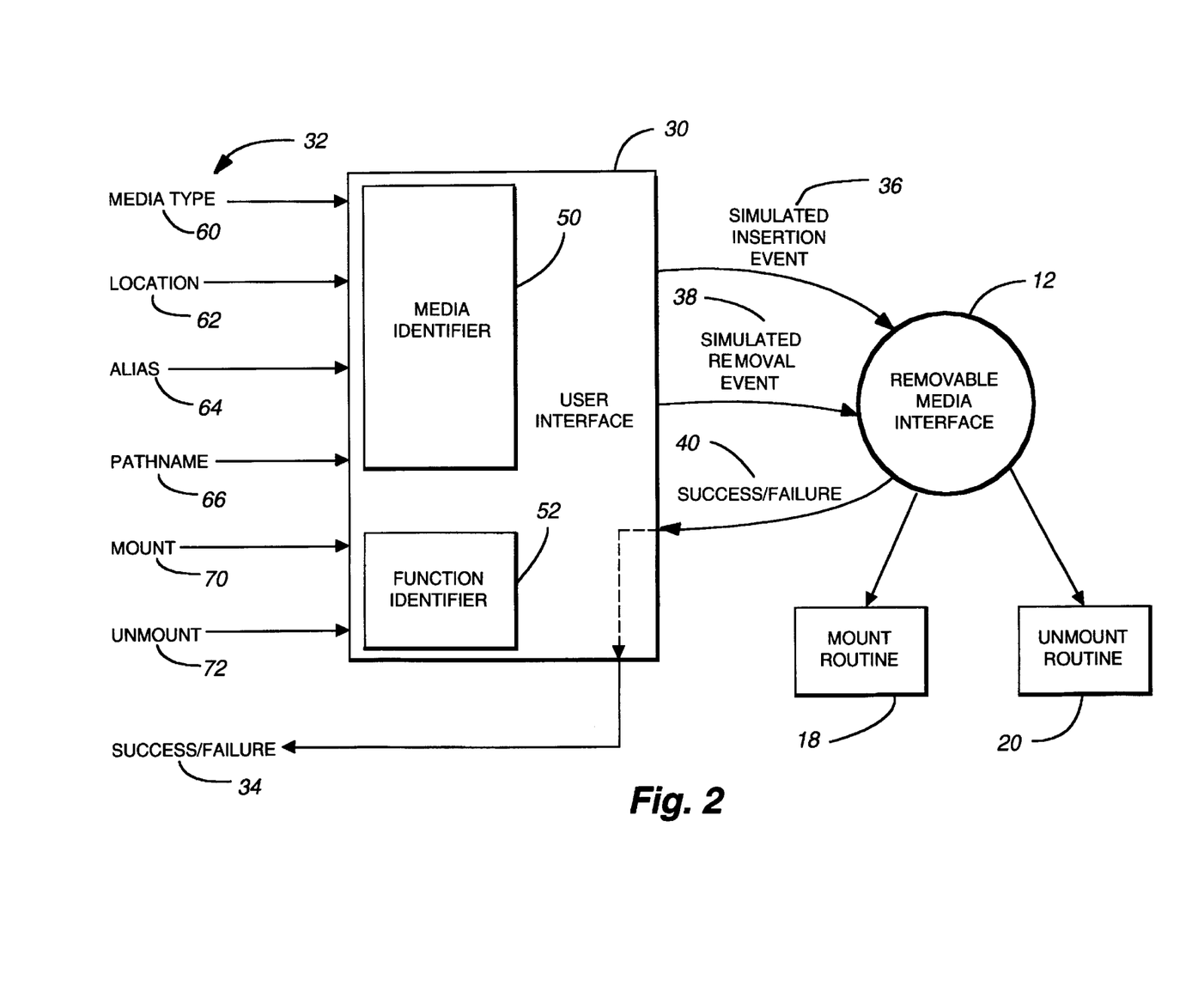
FIG. 2 illustrates a block diagram of the user interface of the present invention and its interaction with the conventional removable media interface.

FIG. 2 shows a block diagram of user interface 30 and removable media interface 12. User interface 30 accepts two forms of user input 32. A media identifier 50 and a function 52 are provided as inputs to user interface 30. The media identifier 50 can consist of a media type 60, a location of the media 62, an alias or symbolic name 64 of the media, or a path name 66 of the media. Using any of these inputs, user interface 30 is able to identify the specific media which the user desires to access. The second input to user interface 30 is function identifier 52. Function identifier 52 identifies the function which the user desires to perform upon the particular media. In the preferred embodiment of the present invention, function identifier 52 can be either a mount command 70 or an unmount command 72.

Based on the media identifier input 50 and the function identifier input 52, user interface 30 generates either a simulated insertion event 36 or a simulated removal event 38 to the removable media interface 12. As described above, removable media interface, responsive to events 36 and 38, accordingly activates mount routine 18 or unmount routine 20. Removable media interface 12 then passes a return value 40 to the user interface 30 indicating the success or failure of the desired operation. User interface 30 then passes this success or failure indication as feedback 34 to the user.

In the preferred embodiment of the present invention, user interface 30 is implemented as a command line interface accessible by a user in the computing system. In particular, a command has been created having switches or arguments for performing a variety of functions with respect to a given media. This command is hereinafter referred to as "volrmmount." The volrmmount command has the following format:

```
volrmmount -i e d media_name
```

In this implementation, the media_name variable corresponds to media identifier 50 of FIG. 2, while the switches -i, -e, and -d correspond to the function identifier 52 of FIG. 2. The switch -i is the function identifier for the insert media command, while the switch -e is the function identifier for the unmount or eject command. The switch -d is the function identifier for another feature of the present invention which provides the user with feedback as to the device which is presently the default device of the volrmmount command.

Hence, in accordance with the present invention, a user desirous of mounting or unmounting a particular media would simply provide input at the command line of the computing system to the user interface 30 through the volrmmount command. For instance, if a user executed the command "volrmmount -e floppy0" the floppy drive corresponding to floppy zero would be ejected from the computing system. As previously discussed, computing systems utilizing conventional UNIX volume management interfaces do not provide the user with the capability of flexibly mounting or dismounting user removable media.

Figure 3:
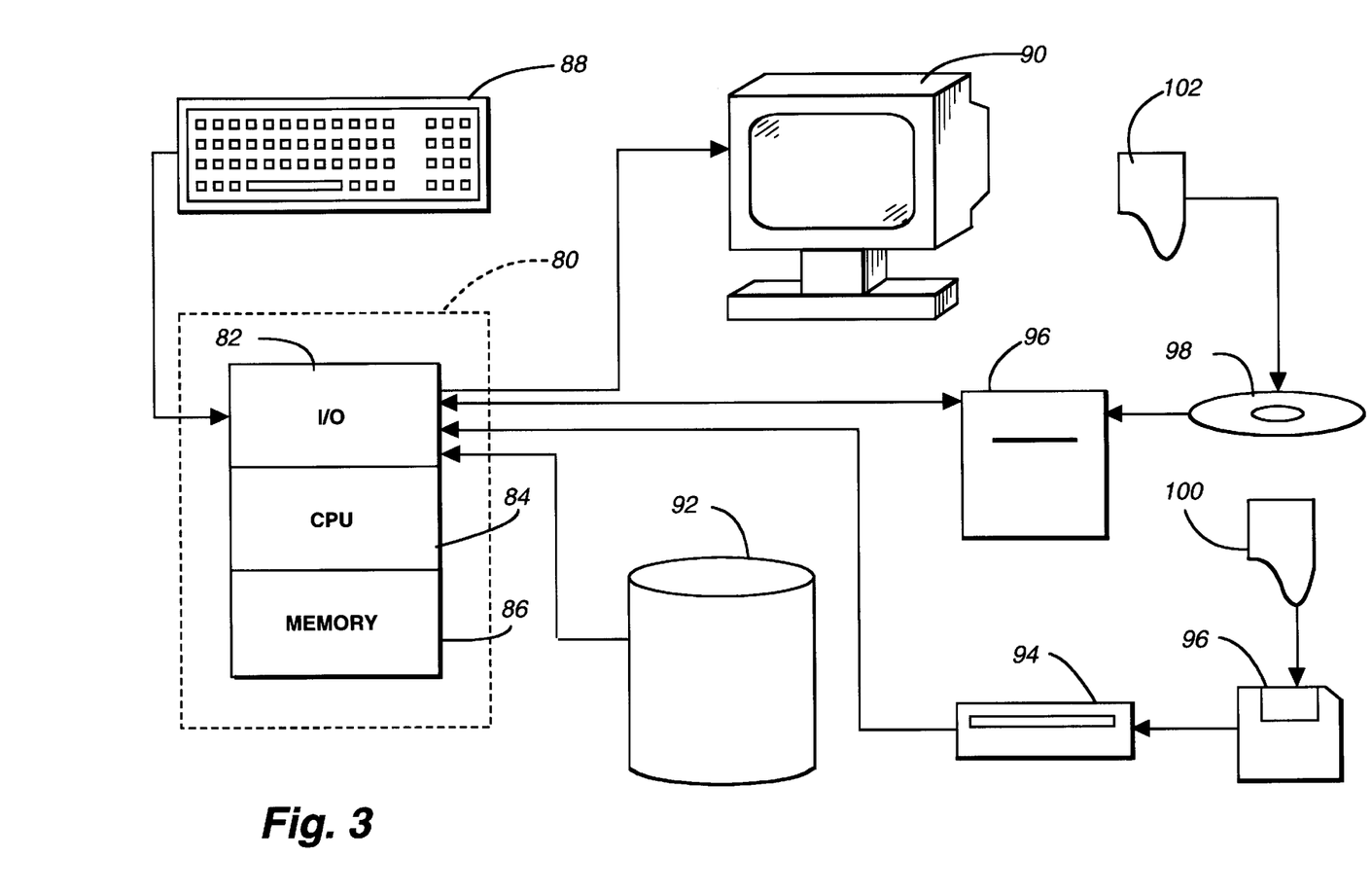
FIG. 3 illustrates a computing system to perform the computer implemented steps in accordance with the invention.

The operating environment in which the present invention is used encompasses standalone computing systems or a general distributed computing system, wherein general purpose computers, workstations, or personal computers are connected via communication links of various types, in a client-server arrangement, wherein programs and data, many in the form of objects, are made available by various members of the system. Some of the elements of a standalone computing system or a general purpose workstation computer are shown in FIG. 3, wherein a processor 80 is shown, having an input/output (I/O) section 82, a central processing unit (CPU) 84 and a memory section 86. The I/O section 82 is connected to a keyboard 88, a display unit 90, a disk storage unit 92, a floppy disk drive 94, and a CD-ROM drive unit 96.

The floppy disk drive 94 can read or write to floppy disk 96 which contains programs 100 or data. The CD-ROM unit 96 can read a CD-ROM medium 98 which typically contains programs 102 and data. The data contained in floppy disk 96 or CD-ROM medium 102 is either file system data containing files and directories; or raw, non-file system data.

The computer program products containing mechanisms to effectuate the apparatus and methods of the present invention may reside in the memory section 86, or on a disk storage unit 92, or on the CD-ROM 98 or floppy disk 96 of such a system. Examples of such systems include SPARC™ systems offered by Sun MicroSystems, Inc., personal computers offered by IBM Corporation and by other manufacturers of IBM-compatible personal computers, and systems running the UNIX operating system or Solaris™ operating system.

Figure 4A:
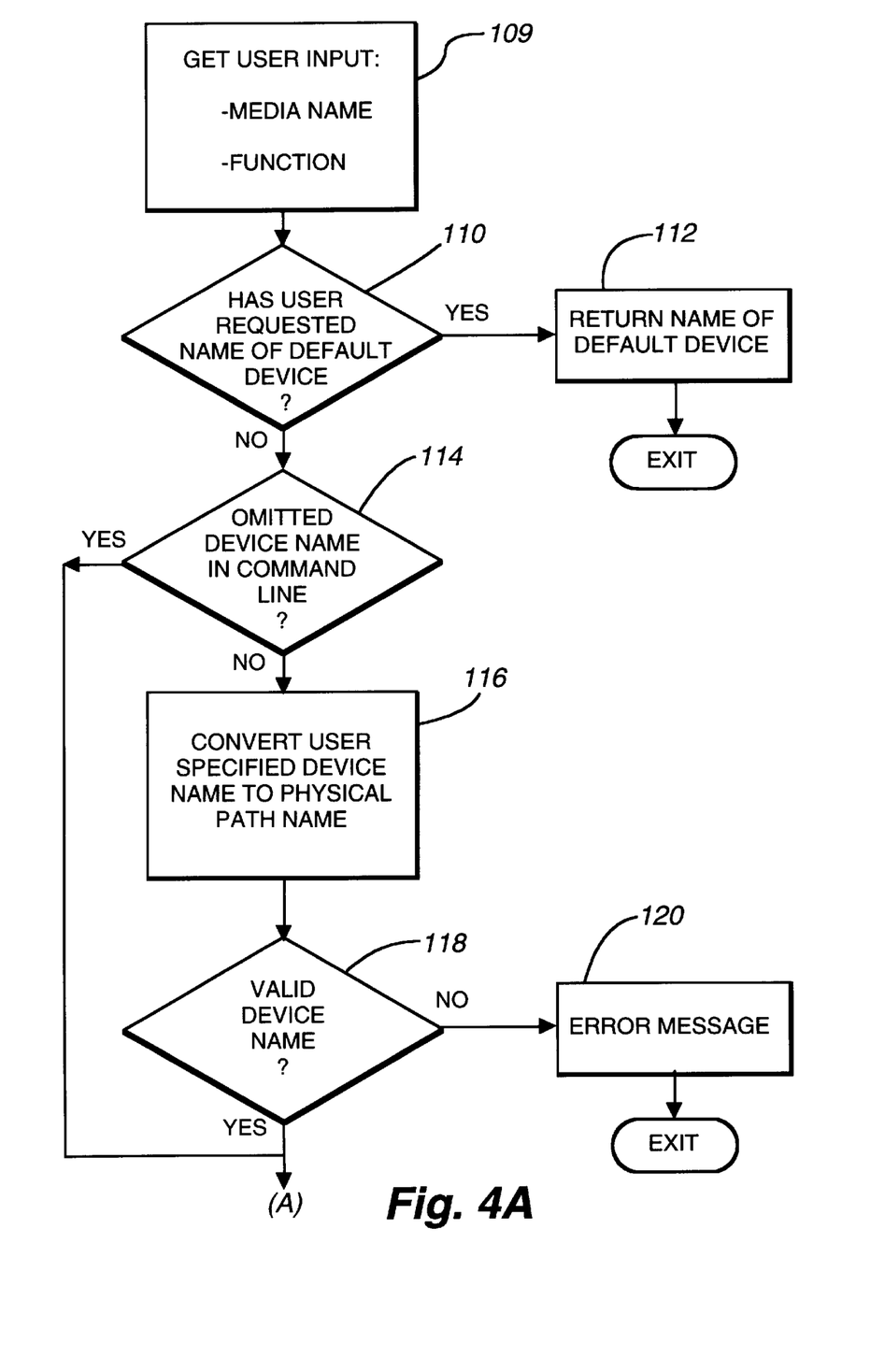
FIGS. 4A and 4B illustrate the logical operations of a preferred embodiment of the present invention to implement the user interface.
Figure 4B:
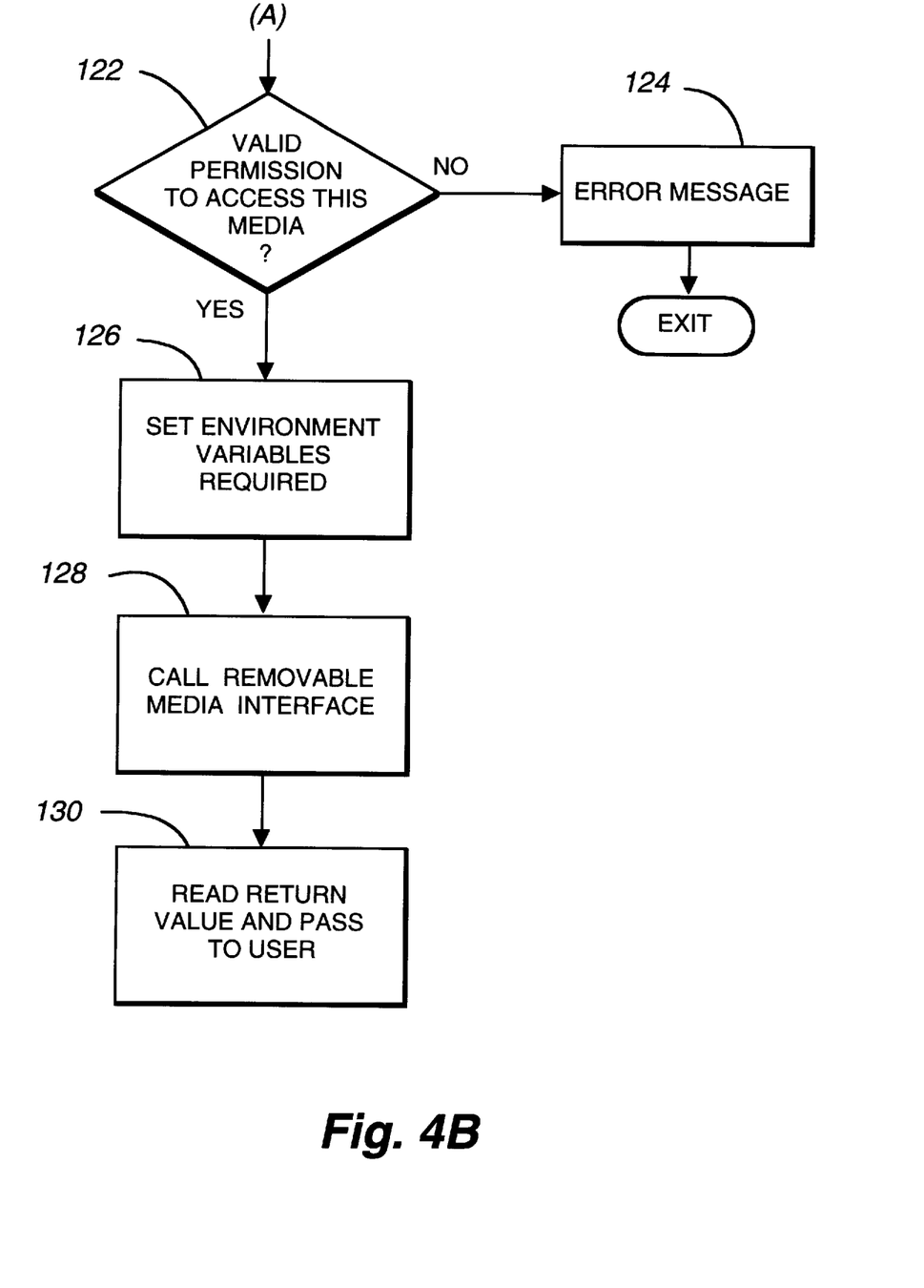

FIGS. 4A and 4B illustrate the logical operations of the preferred embodiment of the present invention to implement the user interface 30 (FIG. 2). As previously discussed, user interface 30 acquires two inputs from the user. Media identifier 50 identifies the media which the user desires to affect by the function specified within function identifier 52.

Referring to FIG. 4A, the logical operations of the user interface 30 are illustrated. Operation 109 obtains input from the user, including the name of the media (media identifier), and the function to be performed (function identifier). The user input can be obtained through parameters placed in the command line by the user when issuing the "volrmmount" command.

In one embodiment of the present invention, user interface 30 has a feature wherein the user may invoke interface 30 without having to explicitly specify a media identifier, thereby implicitly indicating to interface 30 that the current default media or device should be operated upon. This feature simplifies the user's view of the user interface in that the user can issue a mount or eject/unmount command on a media without knowing or having to explicitly specify the precise media name.

As a related feature, user interface can indicate to the user the name of the device or media which is currently the default media. As shown in FIG. 4A, decision operation 110 determines if the user has requested the default device name.

If the user has requested the default device name, then operation 112 returns the default device name to the user. In this manner, the user can obtain from the user interface the present device which the user interface will act upon by default. The user interface routine is then complete, as the user's request for the name of the default device has been satisfied.

Otherwise, if the user has not requested the name of the default device as detected by operation 110, then decision operation 114 determines if the user has omitted the media name in the user's call to user interface 30, volrmmount. If the user has omitted the media name, then the default name maintained by the user interface is utilized, and the conversions and checks of the device name, as discussed below, performed by the user interface are bypassed. Control is then passed to decision operation 122, discussed below.

Otherwise, if the user has provided a media name to the user interface as detected by operation 114, then operation 116 converts the user specified media name to a physical path name. The physical path name is used by the user interface for passing to the removable media interface 12.

The name of the media or device (i.e., "floppy0") is then verified by the user interface. Decision operation 118 determines if the user specified device name corresponds to a valid name in the computing system. If the name is invalid, then operation 120 generates an error message which is ultimately passed to the user by the user interface, and the program exits. Otherwise, control is passed to operation 122.

The user interface now determines if the present user, attempting to mount/unmount the particular media, has the proper permission to access and perform this requested mount/unmount operation. In this context, the present user is referred to as a requester of media access. The present invention ensures that unauthorized users/requesters are not improperly affecting or controlling the media of other users in the computing system.

In FIG. 4B, decision operation 122 determines if the present requester, requesting access to the device, has valid permission to access this device of media. Decision operation 122 can be made by comparing the privileges associated with the media to the privileges of the present requester. In a UNIX-based computing system, the access privileges to a particular media are established when the media is mounted onto the computing system. These access privileges are of the three general categories: user, group, or other access identifiers, and can be examined and compared to the privileges of the present requester. If, for example, the user ID or the group ID or other permissions of the present requester do not match the privilege identifiers associated with the media, then the present user does not have sufficient access privileges and operation 124 generates an error message.

If the present user has sufficient permissions to access the specified media, then operation 126 establishes the user environment variables required by the removable media interface 12. In the conventional implementation of removable media interface 12 in UNIX computing systems, interface 12 must provided with at least five environment variables which are dependant on the particular media which interface 12 is asked to control. These environment variable are further described in conjunction with FIG. 5.

Operation 128 of FIG. 4B then calls or accesses the removable media interface 12 with the appropriate parameters based on the user's input, and operation 130 receives the return value from the removable media interface 12 and passes the return value as feedback to the user indicating the success of failure of the desired operation.

Figure 5:
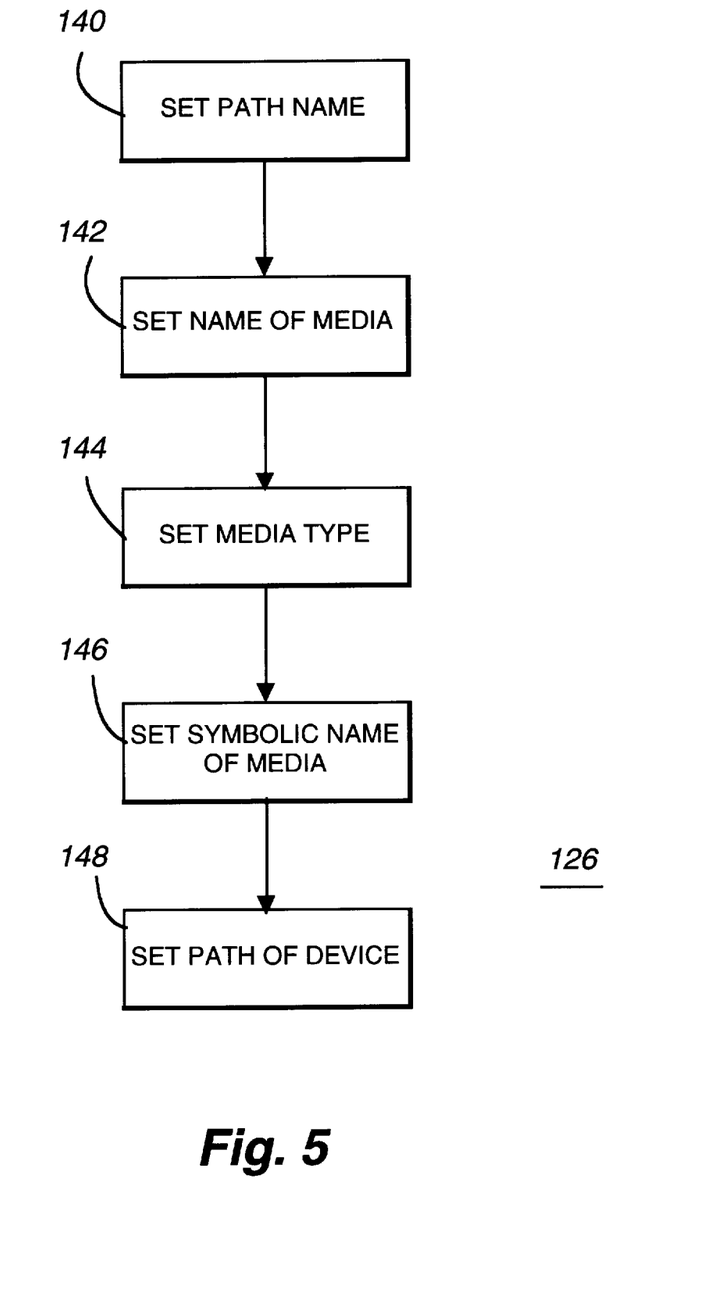
FIG. 5 illustrates the logical operations of passing environment variables from the user interface of the present invention to the removable media interface.

FIG. 5 illustrates the logical operations for establishing and passing the user environment variables, represented generally as operation 126 in FIG. 4B, required by the removable media interface 12. In accordance with a preferred embodiment of the present invention, user interface 30 (FIG. 2) configures and sets these environment variables transparently for the user. In this manner, the user is not burdened with having to set these variables each time the user desires to mount or dismount a user-removable media from the computing system.

As illustrated in FIG. 5, the five variable settings established by the user interface 30 include a path name of the media (i.e. "/vol/dev/rdiskette0/fred"), the name of the media (i.e. "fred"), the media type (i.e. floppy disk, CD-ROM, etc.), the symbolic name of the media (i.e., "floppy0", "CD-ROM2"), and the device path (i.e., "/vol/dev/rdiskette0"). Operations 140–148 of FIG. 5 set these environment variables based on the user input provided to the user interface 30 by operation 109 (FIG. 4A). Specifically, operation 140 sets the media path name, operation 142 sets the name of the media, operation 144 sets the media type, operation 146 sets the symbolic name of the media, and operation 148 sets the device path name. While the particular environment variables discussed herein relate to the specific variables required by the conventional UNIX removable media interface 12 (FIG. 1), it is understood that operations 140–148 can be adapted to operate with any removable media interface within other computing systems.

After any needed environment variables are properly set by the user interface 30, the removable media interface 12 (FIG. 1) is accessed by the user interface in order to effectuate the mount or unmount of the particular user removable media. The particular method of access by the user interface 30 to the removable media interface 12 depends on the conventions of the computing system in which the present invention is implemented. In non-UNIX computing systems, access is achieved by a simple call, with the appropriate parameters, to the removable media interface 12, thereby running the removable media interface 12 with the proper parameters.

Figure 6:
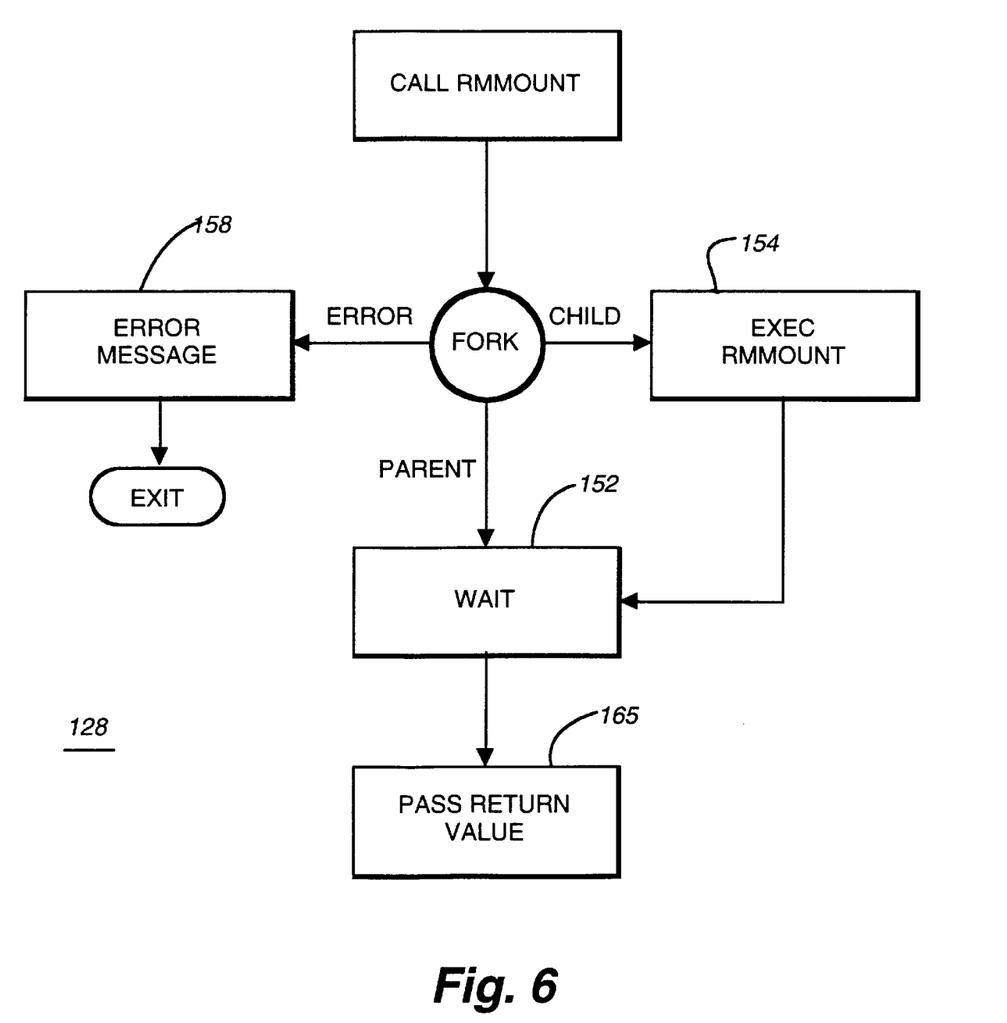
FIG. 6 illustrates a full diagram of the present invention to create a process to call the removable media interface in a UNIX computing system.

In a UNIX-based computing system, a new process must be created using standard UNIX conventions. FIG. 6 illustrates the implementation the call to the removable media interface, rmmount, in a UNIX-based computing system. The standard UNIX conventions of "fork" and "exec" are used to effectuate the call to the rmmount program. Operation 150 "forks" a single process into two separate processes: a parent process and a child process. Any error in the "fork" process generates an error message at operation 158. According to this embodiment of the present invention, the parent process is programmed to merely wait for the termination of the child process. The child process will "exec", or activate, the rmmount program.

Process 152, or the parent process, waits for the termination of the child rmmount process 154. Process 154 returns a return value to the parent process 152 indicating the success or failure of the operation performed by the child rmmount process. Operation 156 reads this return value, which is passed to the user by operation 130 of FIG. 4B.

The operations of the user interface 30 of the present invention have now been described. The user interface 30 provides the user with a flexible and simple interface for mounting and unmouting user removable media from a computing system.

Figure 7:
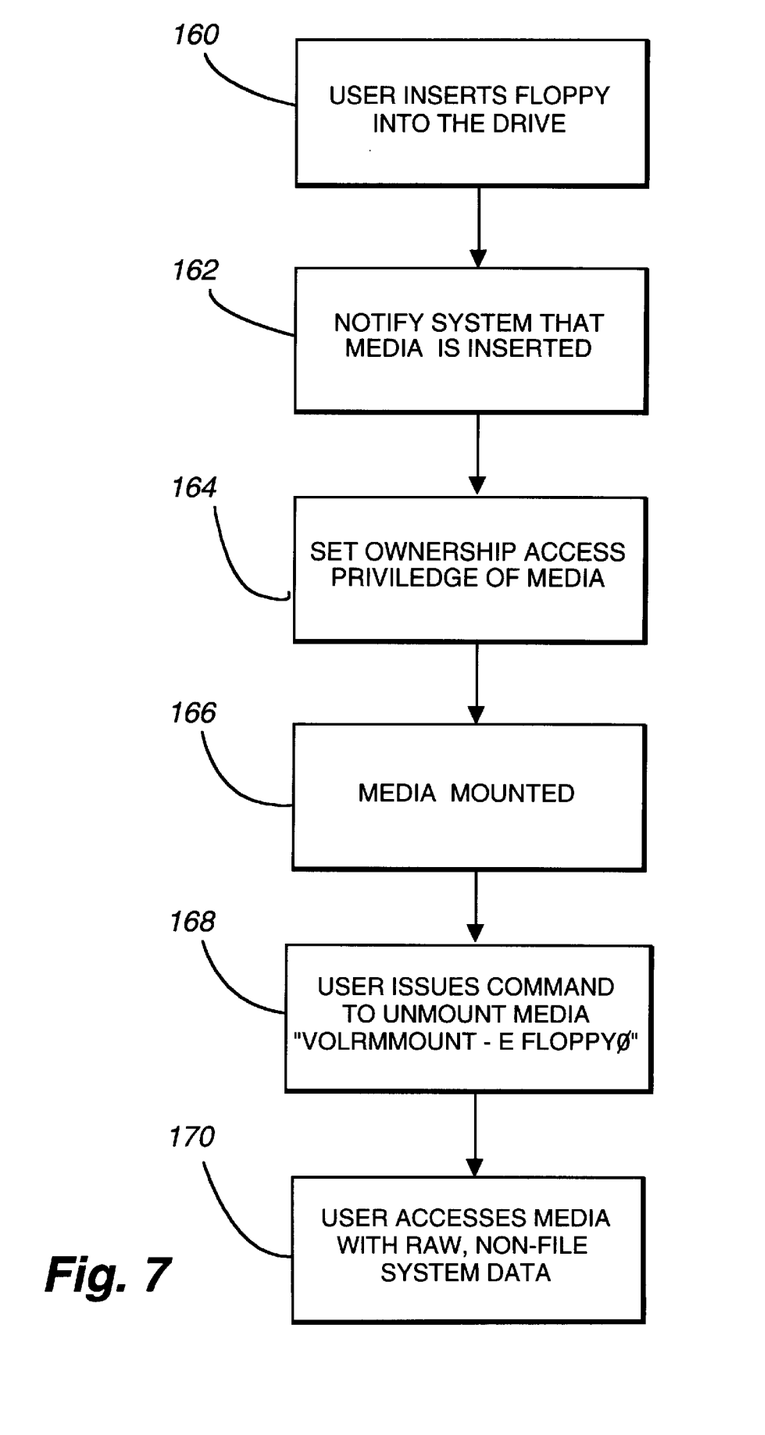
FIG. 7 illustrates the logical operations of a preferred embodiment of the present invention to transfer raw, non-file system data to a media having a file system format.

FIG. 7 illustrates the logical operations for transferring raw, non-file system data to a user removable media, such as a floppy disk, having an existing file system format thereon. As previously discussed, in conventional UNIX computing systems the assumptions made by the conventional removable media interface 12 (FIG. 1) make it difficult for a user to transfer raw, non-file system data to a floppy already having file system data therein. The user interface of the present invention can be invoked by the user to overcome this limitation of conventional computing systems.

Beginning with operation 160 of FIG. 7, the user inserts the floppy disk media into the floppy drive of the computing system. Operation 162 notifies the computing system that the media has been inserted into the computing system. Operation 164 sets the ownership and access privileges of the media so that only authorized users or processes can manipulate the media. As previously discussed in relation to operation 122 of FIG. 4B, user interface 30 of the present invention utilizes the media's ownership and access privileges in determining whether the requester should be permitted to access the identified media.

Operation 166 mounts the media in the computing system. In UNIX-based computing systems, operations 162, 164, and 166 can be performed by the user through the execution of the conventional "volcheck" command which creates a media event 12 (FIG. 1), thereby activating the volume daemon process 10 of FIG. 1. As a further consequence of the "volcheck" command, the volume daemon process 10 passes an insertion event 14 to removable media interface 12, which mounts the media.

According to the present scenario, the floppy disk media already has file system data therein. Hence, mounting operation 166 makes the file system (i.e., directories, subdirectories, and files) of the floppy disk become part of the user's file system. This, however, is an undesirable result since the user wishes only to write raw, non-file system data to the floppy disk.

Therefore, operation 168 unmounts the media from the computing system. This operation has the effect of logically removing the file system contents of the floppy disk from the computing system. The floppy disk, however, is still physically inserted into the floppy disk drive. Prior to the present invention, a user could not easily unmount a media from the computing system for the reasons described above.

Using the present invention, operation 168 can be implemented through the command "volrmmount -e floppy0" (assuming a device name of "floppy0"). The floppy disk media is then unmounted from the computing system, making the floppy disk available to receive raw, non-file system data.

Operation 170 then places the raw, non-file system data on the floppy disk media. For instance, the "tar" command will take all files from a user's directory and place them on a floppy disk as raw, non-file system data. As an example command:

tar -cuf /vol/dev/aliases/floppy0 /home/fred will copy the files from the user directory "/home/fred" and place these files, as raw data, onto "floppy0".

While the invention has been particularly shown and described with reference to a preferred embodiment thereof, it will be understood by those skilled in the art that various other changes in the form and details may be made therein without departing from the spirit and scope of the invention. While the user interface of the present invention has been described herein as a command line interface (i.e., the volrmmount command), it is understood that such interface could be implemented in another form, such as a graphical user interface, and still operate in the same manner.

What is claimed is:

1. A method for mounting a user removable media in a computer system, said method comprising the computer implemented steps of:

acquiring a media identifier input and a function identifier input from a user of the computer system, said media identifier input identifying the user removable media, and said function identifier input specifying a mounting operation to be performed on the user removable media;

processing said media identifier input and said function identifier input to access a system media interface of the computer system;

generating a simulated media event to said media interface to mount the user removable media in the computer system;

reading a return value from said system media interface, said return value indicating a successful outcome of the simulated media event; and passing said return value to said user.

2. The method of claim 1, wherein said processing step further comprises:

converting said media identifier input to a physical path of the user removable media in the computer system; and first determining if said physical path of said media identifier input is valid within the computer system.

3. The method of claim 1, wherein said generating step further comprises:

second determining if said user has valid permission to control the user removable media identified by said media identifier input.

4. The method of claim 3, wherein said second determining step further comprises:

reading a media permission level associated with the user removable media identified by said media identifier input;

reading a user permission level associated with said user; and comparing said media permission level to said user permission level.

5. The method of claim 1, wherein said generating step further comprises:

providing a required permission level to said user for accessing said system media interface.

6. The method of claim 1, wherein said generating step further comprises:

setting a plurality of environment variables for accessing said system media interface.

7. The method of claim 1, further comprising the step of:

calling the system media interface with the simulated media event corresponding to said media identifier input and said function identifier input of said acquiring step.

8. An apparatus for mounting a user removable media in a computer system, the computer system having a processor, an input/output device, and a data storage device, said apparatus comprising:

a user input module for acquiring a media identifier input and a function identifier input from a user of the computer system, said media identifier input identifying the user removable media, said function identifier input specifying a mounting operation to be performed on the user removable media;

an input processing module for processing said media identifier input and said function identifier input to access a system media interface of the computer system;

a simulating module for generating a simulated media event to said media interface to mount the user removable media in the computer system;

a privilege verification module for comparing an access privilege of said user to a media access privilege of the user removable media;

an environmental setting module for setting an environment variable used by said system media interface; and a feedback module for providing a return value from said system media interface to said user, said return value indicating a successful outcome of the simulated media event.

9. A computer program storage medium readable by a computing system and encoding a computer program of instructions for mounting a user removable media in a computer system, said computer program having computer program steps comprising:

acquiring a media identifier input and a function identifier input from a user of the computer system, said media identifier input identifying the user removable media, and said function identifier input specifying a mounting operation to be performed on the user removable media;

processing said media identifier input and said function identifier input to access a system media interface of the computer system; and generating a simulated media event to said media interface to mount the user removable media in the computer system;

reading a return value from said system media interface, said return value indicating a successful outcome of the simulated media event; and passing said return value to said user.

10. The computer program storage medium of claim 9, where, in the computer process, the computer program step of processing further comprises:

converting said media identifier input to a physical path of the user removable media in the computer system; and first determining if said physical path of said media identifier input is valid within the computer system.

11. The computer program storage medium of claim 9, where, in the computer process, the computer program step of generating further comprises:

second determining if said user has valid permission to control the user removable media identified by said media identifier input.

12. The computer program storage medium of claim 11, where, in the computer process, the computer program step of second determining further comprises:

reading a media permission level associated with the user removable media identified by said media identifier input;

reading a user permission level associated with said user; and comparing said media permission level to said user permission level.

13. The computer program storage medium of claim 9, where, in the computer process, the computer program step of generating further comprises:

providing a required permission level to said user for accessing said system media interface.

14. The computer program storage medium of claim 9, where, in the computer process, the computer program step of generating further comprises:

setting a plurality of environment variables for accessing said system media interface.

15. The computer program storage medium of claim 9, where, in the computer process, the computer program steps further comprise:

calling the system media interface with the simulated media event corresponding to said media identifier input and said function identifier input of said acquiring step.

* * * * *